Nov. 18, 1952  S. CLAVÉ ET AL  2,618,200
COMPOSITE BIFOCAL LENS
Filed March 31, 1949

S. CLAVÉ AND M. CLAVÉ
INVENTORS
BY Wenderoth, Lind & Ponack
ATTORNEYS

Patented Nov. 18, 1952

2,618,200

UNITED STATES PATENT OFFICE 2,618,200

COMPOSITE BIFOCAL LENS

Serge Clavé and Marcel Clavé, Paris, France

Application March 31, 1949, Serial No. 84,548
In France April 1, 1948

1 Claim. (Cl. 88—54)

The present invention relates to new combinations of correcting glasses for spectacles, more particularly to bifocal glasses for near and far sight.

An object of this invention is to provide series of improved premanufactured spectacle glasses or lenses, including a relatively reduced number of different preformed glasses adapted to be associated together for the obtention of any sight correction in a very wide range.

Another object of this invention is to provide series of improved premanufactured spectacle glasses or lenses adapted to be associated together for the obtention of any sight correction without any cutting of said spectacle glasses.

Many types of correcting bifocal spectacle glasses or lenses have been known heretofore, which may be classified into three main groups:

1. The lenses of the Franklin type, comprising a pair of associated lenses having the same optical axis.

2. The solid lenses made of a single glass member having a face cut to form two respectively different curvature radii; such lenses usually are called bifocal cut glasses.

3. The bifocal spectacle glasses composed of a pair of cemented or fused lenses, wherein a small size lens having a refraction index $n2$ is associated with a main lens of refraction index $n1$ different from $n2$, both lenses being assembled together either by pasting, or more usually by fusing the respective adjacent surfaces thereof.

The first-mentioned type of lenses only permits the mass production of all bifocal symmetrical or toric or cylindrical lenses for near and far sight with reduced expense. This type of correcting spectacle glasses however has been abandoned for a number of reasons, such as their inaesthetic form and the separation line between both lenses which projects from the finished lens and easily retains dust.

Both other types of spectacle lenses find favor with the customers, as having the above-mentioned drawbacks at a lesser degree, but have a higher cost price. Further, they cannot be stored in advance for any type of sight, due to the excessive number of combinations required, as will now be shown.

The number of usual combinations for spectacle glasses having a power comprised within the range —20 to +8 dioptries by irregularly spaced values according to the common scale amounts to 75 for the spherical or symmetrical glasses and to 992 for the toric or cylindrical glasses. Moreover, when adding to each such lens the number of complementary powers as indicated in the manufacturers' booklets for forming the usual bifocal lenses, then 865 different combinations are obtained for the symmetrical or spherical glasses and 12,800 for the toric or cylindrical glasses.

Further, in the case of the latter glasses, since the direction of the main meridian may vary by steps every 5° from 0° to 180°, then the last given number is to be multiplied by 36, and thus the number of different combinations for the toric or cylindrical correcting glasses amounts to 460,800.

The above numbers, however, are three times greater when considering the shaded correcting spectacle glasses, which usually present three different opacities referred to by the letters A, B and C in the catalogues of the spectacle manufacturers, the A-glasses transmitting all visible light radiations, the B-glasses transmitting about 60% of said radiations, and the C-glasses only transmitting about 40% thereof.

While it may be considered as yet possible to manufacture and store spherical correcting glasses of the shade A class, such a storage becomes impossible for the other shades and for toric or cylindrical bifocal spectacle glasses, due to the excessive number of the combinations thereof.

The new optical combination according to the present invention, however, enables mass manufacture of all types of correcting bifocal spectacle glasses of any shade, with spherical or toric or cylindrical power, such types being obtained by associating together a reduced number of prefabricated spectacle lenses.

The invention will be best understood from the following description thereof, taken in conjunction with the annexed sheet of diagrammatic drawings, wherein.

The new combination according to the invention comprises a pair of lenses, which will be hereafter referred to as $L_1$ and $L_2$, and manufactured according to any well known method. The first lens $L_1$ is a single focus, spherical, toric or cylindrical lens, and the second lens $L_2$ is a bifocal lens. On the other hand, both lenses $L_1$ and $L_2$ have a curvature radius of same value, but of reverse sign, on a respective face thereof, thereby enabling their assembly by cementing, this curvature radius further is maintained the same within a complete series of correcting spectacle glasses having different powers, whereby a very reduced number of single focus lenses and of bifocal lenses may be combined together in a considerable number of ways. Obviously, the bifocal lens $L_2$ may be a lens of the cut type, or of the fused type.

For the obtention of a given combination, the lens $L_2$ to be used is so designed, that the sum of its powers $D'1$ and $D'2$ and of the power $D'$ of the lens $L_1$ equals the desired powers $D1$ for far sight, and $D2$ for near sight.

A particularly interesting combination, both as to its appearance and its hygiene, further offering the maximum number of technical advantages, is obtained in the case where the lens $L_2$, of the fused type, is so manufactured that one of its powers equals zero, that is $D'1=0$, and the other power equals the desired addition N corresponding to near vision, that is $D'2=N$. In such a case, the power of the lens $L_1$ is chosen equal to $D'$, that is the power for far sight, and this lens may be taken from the series of ponctual lenses of conventional use. Thus, the combination of two such lenses furnishes a new bifocal assembly, having respective powers, $$D1 = D'$$

and $$D2 = D' + N = D1 + N.$$

Figure 1:
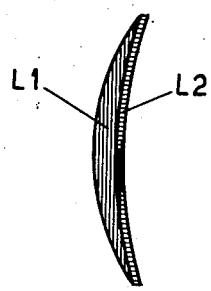
Figure 1 is a diagrammatic section through a positive arrangement according to the invention.
Figure 2:
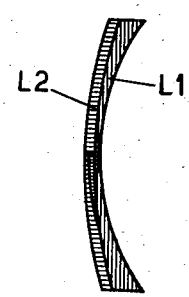
Figure 2 is a similar section in the case of a negative lens arrangement.

An illustrative embodiment of such an arrangement is shown in section in Figs. 1 and 2, Figure 1 relating to a positive lens, and Figure 2 to a negative one.

Only one curvature radius however cannot be used on the cementing surfaces of the single focus lens with the bifocal one, due to the astigmatism corrections. A same curvature radius may be yet maintained on one surface in single focus lenses of the toric or cylindrical type within a more or less limited number of powers, without thereby affecting the lens with any awkward astigmatism.

The said pasting or common surface, hereafter called "base," is the front face of positive lenses, and the rear face of negative lenses.

Advantage may be taken from the just mentioned property for reducing to a minimum the number of the bifocal lenses $L_2$ to be associated with lenses $L_1$ having the same base. Of course, according to the above-described manufacturing process, for a given base and a given additional power N, a single type of lens will be used, having powers $D'1=0$ and $D'2=N$, and will be pasted to any lens $L_1$ of specific power $D'$ having the same base. Thus, the number of lenses $L_2$ corresponding to a given base will be limited to a number of supplementary lenses corresponding to the predetermined number of additional powers N.

For usual purposes, the values of the additional power N vary within $N=+0.5$ and $N=+4$ dioptries, by steps of $1/4$ dioptrie, thus giving a maximum number of 15 lenses $L_2$ for a predetermined base in the whole considered range of additional powers. On the other hand, from a given power up, the commonly used additional powers are comprised in the range $N=+2$ to $N=+4$ dioptries and differ by $1/2$ dioptrie from each other, thus reducing to five the number of additional lenses $L_2$ corresponding to a predetermined base.

In practice, the number of bases may be reduced to five for lenses having powers varying within the range $+8$ to $-20$ dioptries, whether the lenses are spherical, toric or cylindrical. Thus 75 spherical lenses may be associated with 45 special bifocal lenses for obtention of the 865 spherical lenses of commonly used powers, and 992 toric or cylindrical lenses may be associated with the same 45 special bifocal lenses for giving at least the 460,800 more frequent astigmatic combinations. These numbers, of course, are to be considered as illustrative examples only, since, should the correction be more or less perfect, a greater or fewer number of bases may be employed.

In either case, the number of single focus lenses remains constant, and only the number of special bifocal lenses decreases or increases by some digits. If the number of bases is doubled in the example chosen, then this would involve the manufacture of 90 special bifocal lenses instead of 45, which number is of no importance with respect to the total number of combinations.

When cementing both lenses $L_1$ and $L_2$ together, the new combination according to the invention also gives the possibility of eccentering these lenses with respect to each other without introducing any prismatic effect for far sight, in the cases where the bifocal lens meets the particular conditions $D'1=0$, and $D'2=N$. In this way is avoided the construction of a right hand lens and of a left hand lens, which is required according to other manufacturing methods, in order to keep clear of the presence of prismatic effect in far sight.

Figure 4:
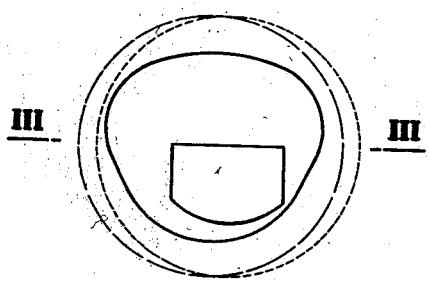
Figure 4 is a front view of Fig. 3.
Figure 3:
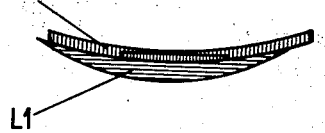
Figure 3 shows in section the assembly of two associated lenses eccentered with respect to each other, the section being taken along the line III—III of Fig. 4.
Figure 6:
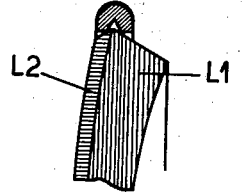
Figure 6 is a view similar to Fig. 5, in the case of a negative lens.

Fig. 3 shows in cross-sectional view an assembly of two lenses $L_1$ and $L_2$ eccentered with respect to each other, as has just been explained, and Fig. 4 shows the same assembly in front view, the large line indicating the outer contour of the lens after final cutting.

With the new combination according to the invention, correcting isochromatic shaded glasses for spectacles may also be obtained, either by using bifocal lenses $L_2$ manufactured according to any well-known method from integrally shaded glass, or by assembling both lenses by means of a shaded paste, or else by placing between both lenses a shaded film of very thin plastic material, according to any well-known means. In the case where the glasses are integrally shaded, the number of supplementary lenses is limited to the number of the bifocal lenses $L_2$ only, which number is very reduced. In both other cases, use is made of the lenses of the A-shade for any combination of shaded correcting glasses.

It has been mentioned above that the bifocal lenses of the fused type are made of two lenses having different refractive indicia $n1$ and $n2$ respectively; that portion of the finished lens which has been cut in the material of higher index offers the disadvantages of easily oxidizing and scratching. The present invention permits avoiding these drawbacks by assembling the lenses in such a way that that portion of the lens $L_2$ having a fragile surface is united to the lens $L_1$ by pasting, thereby providing a final bifocal lens having outer surfaces made of the stronger material. This kind of arrangement has been illustrated in Figs. 1 and 2 of the annexed drawings.

It may be emphasized also that both lenses L1 and L2, since they are of similar outer diameter, extend in the groove of the spectacle mounting, and, therefore, are fixedly positioned with respect to each other.

Figure 5:
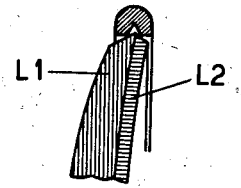
Figure 5 is a detailed sectional view of the mounting of an assembly according to the invention, in the case of a positive lens.

Fig. 5 is a detailed sectional view of such an arrangement equipped in the fixing ring of a spectacle mounting, for a positive lens, and Fig. 5 is a similar view in the case of a negative lens. In the cases where the mountings are not provided with fixing rings or circles, the lens may be fixedly positioned by mounting claws.

In both above-described cases, the separation line of the pasted lenses L1 and L2 extends along the outer periphery of the lenses and paste which is likely to soften due to heat rises does not let any mark on the polished surfaces.

The lenses according to the invention may be obtained by mass production from conventional correcting spectacle glasses, and further the invention is of interest for the retail opticians who may deliver spectacles according to any prescription, from the single focus spectacle glasses up to the most complicated bifocal combinations, by means of a reduced number of stored glasses, without needing to make any special order to the manufacturer.

What we claim is:

An optical bifocal correcting cemented lens assembly comprising a first single focus lens, said first lens providing the curvature for farsight power of the lens assembly, a second composite lens of zero power cemented to said first lens, said second composite lens having a curvature which is complementary to said first lens, said first and second lenses having different indices of refraction, said zero power composite lens comprising a zero power lens of the same curvature as the zero power lens assembly curvature and a separate lens segment embedded in said zero power lens, said lens insert being of different index of refraction than said zero power lens, said composite lens assembly being separately mountable as a unit for cementing to said first lens providing the far-sight power, said zero power lens in said composite lens being adapted to carry embedded lens segments of different powers to provide a series of interchangeable zero power composite lenses providing the near-sight power of the bifocal lens assembly, whereby the number of stock combining lenses required for a predetermined far-sight power and a predetermined near-sight power is considerably reduced, and the outer surface of said separate lens segment having a radius of curvature which is the same as the radius of curvature of said first lens whereby the replacement of said first lens in varying powers and the replacement of said composite zero power lens permits in accordance with the variation of the angular positioning of the lenses the arrangement of a continuously varying system of bifocal lenses.

SERGE CLAVÉ.
MARCEL CLAVÉ.

REFERENCES CITED

The following references are of record in the file of this patent:

UNITED STATES PATENTS

| Number | Name | Date |
| --- | --- | --- |
| 392,053 | Morck | Oct. 30, 1888 |
| 1,152,249 | Wells | Aug. 31, 1915 |
| 1,171,419 | Fink | Feb. 15, 1916 |
| 1,886,649 | Culver et al. | Nov. 8, 1932 |
| 1,948,636 | Tillyer | Feb. 27, 1934 |
| 2,021,812 | Sterling | Nov. 19, 1935 |
| 2,024,552 | Tillyer | Dec. 17, 1935 |
| 2,125,056 | Tillyer | July 26, 1938 |

FOREIGN PATENTS

| Number | Country | Date |
| --- | --- | --- |
| 338,555 | Great Britain | Nov. 20, 1930 |
| 433,710 | Great Britain | Aug. 15, 1935 |
| 559,865 | Great Britain | Mar. 8, 1944 |

OTHER REFERENCES

Serial No. 416,126, Clave et al. (A. P. C.), published May 4, 1943.

Henker (Text), "Theory of Spectacles," published by Jena School of Optics, 1924, pages 219, 220 and 221. (Copy in Div. 7.)